Jan. 12, 1926. 1,569,837
H. P. MACDONALD
MEANS FOR DETERMINING TENSION ON BOLTS
Filed March 26, 1920
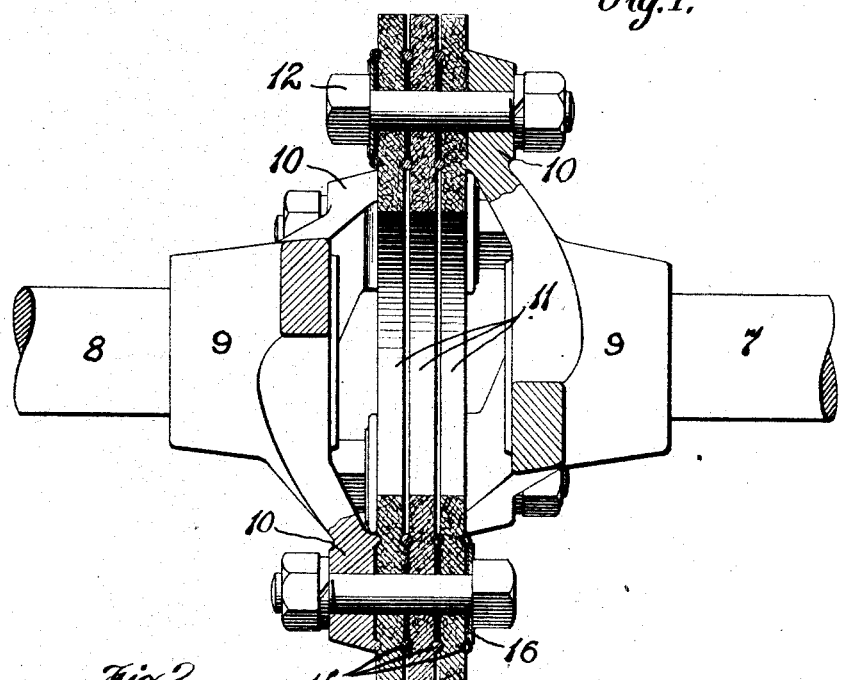
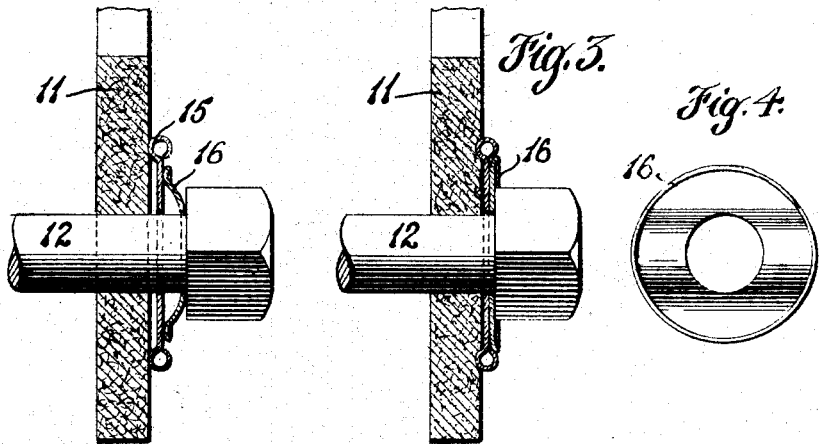

Patented Jan. 12, 1926.

1,569,837

UNITED STATES PATENT OFFICE.

HARRY P. MACDONALD, OF MONTCLAIR, NEW JERSEY, ASSIGNOR, BY MESNE ASSIGNMENTS, TO SPICER MANUFACTURING CORPORATION, OF SOUTH PLAINFIELD, NEW JERSEY, A CORPORATION OF VIRGINIA.

MEANS FOR DETERMINING TENSION ON BOLTS.

Application filed March 26, 1920. Serial No. 369,146.

*To all whom it may concern:*

Be it known that I, HARRY P. MACDONALD, a citizen of the United States, residing at Montclair, county of Essex and State of New Jersey, have invented certain new and useful Improvements in Means for Determining Tension on Bolts, of which the following is a specification.

This invention relates to a means for determining the tension on tension members, such, for example, as bolts, and it is particularly useful in connection with such members as flexible joints having a plurality of bolts, the tension of which should not only be uniform but also predetermined so as to prevent the damage to the flexible elements which results from too great compression or the destruction which follows when the bolts are not drawn tightly enough.

The objects and advantages of my invention will be best understood from a description of the preferred form of apparatus employed, which is illustrated in the accompanying drawings, wherein:

Fig. 1 is a cross section taken through a flexible joint, illustrating an application of my invention; Fig. 2 is an enlarged section of one form of tension indicating means, not compressed; Fig. 3 is a similar section showing the member compressed; and Fig. 4 is a plan view of the element shown in Figs. 2 and 3.

The flexible joint shown in Fig. 1 is suitable for use in automotive or other torque transmitting assemblies, and it comprises a driving shaft 7; a driven shaft 8; a pair of spider members 9 having rounded feet 10; the flexible discs 11 which may be any desired number; the holding bolts 12 by means of which the discs are respectively secured to the spiders; the clamping members or washers 15 are interposed between the discs and underneath the bolt heads and are constructed with an annular rim or bead adapted to exert pressure on the disc at a point well removed from the bolt, for purposes which are fully set forth in my copending application Serial No. 315,613 filed August 6, 1919. It will readily be understood that in devices of this general character, the tension of the bolts bears directly on the quality of service and the life of the joint. Whether or not the bolt has been tightened uniformly and to the proper point is dependent entirely upon the skill of the workman and he has nothing to guide him other than his sense of touch, but while this may be sufficiently accurate in general machine work where metal parts are to be bolted, it is totally inadequate when dealing with soft or yielding materials, such as the rubberized fabric of which the discs of a joint, for example, are made. I propose to provide an indicating medium which will immediately apprise the workman when he has put the proper amount of tension on any given bolt and which will secure substantial uniformity of the tension of all of the bolts.

To this end, I provide a yielding element, such, for example, as the deformed washers 16, of which I place one under the head of the bolt or at some other suitable place, the washer being so constructed that when the nuts are sufficiently drawn up, the washers will be flat. The workman will thus be immediately apprised of the fact that the proper amount of tension on the bolts is had by the condition of the washer member, and since such members can be made with substantial uniformity, the tension on all of the bolts will be approximately equal. It will, of course, be understood that the washers may be constructed to indicate any predetermined tension.

I prefer to use a washer which is given a bend transversely thereof, and the preferred location is underneath a nut or the head (i. e., a head member) of the bolt and intermediate the nut or head and one of the beaded washers 15, the advantage of which is that in case of breakage of the tension indicating washer, such washer will not fall off and thereby alter the tension of the bolt, but it will be retained in position by virtue of the peripheral bead of the washers 15.

It will be apparent to those skilled in the art that my invention has other applications and it is to be understood that I do not limit myself to the particular indicating means herein disclosed, but comprehend all means within the spirit of my invention as defined in this specification and the claims hereof.

I claim:

1. The combination with a torque transmitting flexible joint comprising a flexible member of yielding material and means gripping the same for torque transmission including a tension bolt, of means for indicating the tension on the bolt and thus preventing over stressing of the material.

2. The combination with a torque transmitting flexible joint comprising a flexible member of yielding material, clamping members for gripping it, and a tension bolt for said clamping members, of a tension indicating device interposed between one of said clamping members and a head member of the bolt.

3. The combination with a torque transmitting flexible joint comprising a flexible member of yielding material, clamping members for gripping it, and a tension bolt for said clamping members, of an initially deformed washer between one of said clamping members and a head member of the bolt, so constructed and correlated with the properties of the flexible member as to be substantially flattened when the bolt is tightened to grip the latter properly.

In testimony whereof, I have hereunto signed my name.

HARRY P. MACDONALD.